(12) United States Patent
Reddy et al.

(10) Patent No.: US 6,904,588 B2
(45) Date of Patent: Jun. 7, 2005

(54) PATTERN-BASED COMPARISON AND MERGING OF MODEL VERSIONS

(75) Inventors: Sreedhar Sannareddy Reddy, Pune (IN); Josyula Ramakrishna, Mabarashtra (IN)

(73) Assignee: TAT Consultancy Services Limited, Nariman Point Mumbai (IN)

( * ) Notice: Subject to any disclaimer, the term of this patent is extended or adjusted under 35 U.S.C. 154(b) by 663 days.

(21) Appl. No.: 10/059,696

(22) Filed: Jan. 28, 2002

(65) Prior Publication Data

US 2003/0084424 A1 May 1, 2003

(30) Foreign Application Priority Data

Jul. 26, 2001 (IN) .................................. 722/MUM/2001

(51) Int. Cl.⁷ ................................................ G06F 9/44
(52) U.S. Cl. ...................................................... 717/104
(58) Field of Search ................................ 717/104–109, 717/120–123; 707/100, 102, 103

(56) References Cited

U.S. PATENT DOCUMENTS 5,838,973 A  * 11/1998  Carpenter-Smith et al. . 717/105
6,269,473 B1 *  7/2001  Freed et al. ................. 717/104
6,442,748 B1 *  8/2002  Bowman-Amuah ......... 717/108
6,550,057 B1 *  4/2003  Bowman-Amuah ......... 717/126
6,598,219 B1 *  7/2003  Lau ............................ 717/108

FOREIGN PATENT DOCUMENTS

IN   722/MUM/2001       7/2001

OTHER PUBLICATIONS

Alho. A Data Data Manager. ACM. 1998. p. 202.*
Al–Khudair et al. Dynamic Evoluation and Consistency of Collaborative Configurations in Object–Oriented Databases. IEEE. 2001. pp. 207–218.*
Jea et al. A Difference–based Version Model for OODBMS. IEEE.*
Song et al. Experience with an Approach to Comparing Software Design Methodologies. IEEE. 1994. pp. 364–384.*

* cited by examiner

*Primary Examiner*—Wei Y. Zhen
(74) *Attorney, Agent, or Firm*—Donald R. Boys; Central Coast Patent Agency, Inc.

(57) ABSTRACT

A software tool for computing and displaying differences in at least two object oriented workspaces compared and for reconciling the differences by merging the workspaces has at least one object association graph used as a modeled template for defining the nodes and node paths involved in the difference computation, a data tree structure for displaying element hierarchy symmetrically in each of the compared workspaces, an executable function for merging the separate workspaces to reconcile the found differences, and an interactive user display window for visualizing and directing the process. The tool is characterized in that a user monitors the data structures in each workspace from the display window and executes the difference and merge operations through interaction with the data structure.

18 Claims, 4 Drawing Sheets

Difference Computation Data Structure

PATTERN-BASED COMPARISON AND MERGING OF MODEL VERSIONS

FIELD OF THE INVENTION

The present invention is in the field of software development and pertains particularly to a method and system for pattern-based comparison and merging of model versions.

CROSS-REFERENCE TO RELATED DOCUMENTS

The present invention claims priority to Indian provisional application serial number 722/MUM/2001 filed Jul. 26, 2001. The entire Indian application is included herein in its entirety by reference.

BACKGROUND OF THE INVENTION

The worldwide software industry is gradually moving to a new paradigm of development where object modeling is moving from being just an analysis/design aid to being a more pervasive end-to-end system development tool. This new paradigm views modeling and coding on a continuum with more components being traversed from the domain of coding to the domain of modeling. This shift has been facilitated by the emergence of various modeling standards like Unified Modeling Language (UML), Meta Object Facility (MOF), Extended Markup Language (XML), and so on. There are ongoing development efforts to make such facilities semantically richer.

When modeling takes over the space of coding, it must contend with the problems of size, change, and variation just as coding does now. To manage the complexity of size, information systems are partitioned into separate modules or components that interact with each other. During system development, these components are assigned to team members who work on them in parallel using independent workspaces (configurations). These independent workspaces are then consolidated or merged into a baseline workspace through a process known as 'diff & merge'. Diff & merge essentially involves comparison of two workspaces and reconciling the differences by copying and/or deleting appropriate elements from one workspace to the other. Diff & merge is a complex process fraught with risks if not performed carefully. It has occurred to the inventor that the process would be greatly enhanced if a tool were available that could meet the conditions stated below.

Firstly, a proposed tool must present differences between parallel workspaces in a structured manner that makes semantic sense to a user. Additionally, the difference-presentation structure should reflect the structure of the model.

Secondly, a proposed tool should have a capability of keeping the difference presentation updated dynamically as the differences are reconciled incrementally. This requirement is critical, especially in a model repository, where model elements are typically connected up in a graph-like structure. When a model element is modified during the merge process, the differences should be recomputed for all the impacted elements. If this were not done, difference presentation would be inaccurate, leading to incorrect merge operations.

Thirdly, in the case of extensible model repository systems, a proposed tool should enable end-users to specify a structure for difference computation for any model elements that are user-introduced.

Most commercial repository systems do not provide any built-in tool support for workspace level diff and merge capability. Instead, they provide object-level support for detecting conflicts when an object is checked into a baseline. In this case, a user must manually compare the two differing object versions and then manually reconcile the differences.

Systems that do provide built-in support for diff and merge only do so for pre-defined, standard meta models such as UML models or ER models. There is as yet in prior or current art no provision for extending diff and merge capabilities to user-enhanced meta models. There is no known system that can satisfy the three desires stated above.

Therefore, what is clearly needed is a software tool supported by algorithm that can provide diff and merge capability such that the three conditions stated above are satisfied.

SUMMARY OF THE INVENTION

In a preferred embodiment of the present invention a software tool for computing and displaying differences in at least two object oriented workspaces compared and for reconciling the differences by merging the workspaces is provided, comprising at least one object association graph used as a modeled template for defining the nodes and node paths involved in the difference computation, a data tree structure for displaying element hierarchy symmetrically in each of the compared workspaces, an executable function for merging the separate workspaces to reconcile the found differences, and an interactive user display window for visualizing and directing the process. The software tool is characterized in that a user monitors the data structures in each workspace from the display window and executes the difference and merge operations through interaction with the data structure.

In a preferred embodiment of the tool one of the workspaces is a source workspace and one or more workspaces are destination workspaces. Also in a preferred embodiment differences include model version, model associations and model properties of same class of models. In some embodiments the data tree structures for each workspace are rendered symmetrical to each other by generation and placement of a dummy node in the structure of a workplace where no node corresponding to an existing node in another workspace exists. Also in some embodiments the difference computation is performed separately for each object association graph included in a workspace. In some cases the merge operation is performed incrementally, in others each workspace is dynamically updated during the merge operation, and in still others the interactive display window is divided according to number of workspaces.

In another aspect of the invention a method for computing differences and reconciling the differences associated with at least two separate workspaces of an object oriented software system is provided, comprising steps of (a) developing at least one model association graph specifying the nodes, attributes and properties used as a template for comparison of the workspace objects; (b) establishing a difference tree structure of nodes and attributes for presentation of each workspace to be compared; (c) executing a difference computation at a root node within the source workspace, the computation progressing down the sub-tree of the root node in compared workspaces; (d) displaying differences if any in the tree structures of the workspaces; and (e) executing at least one merge operation if differences are found by interacting with the displayed tree structure at the node containing the differences, the merge operation progressing down the sub-trees of the activated node represented in the compared workspaces.

In a preferred embodiment, in step (a), the model association graph is a view of a meta model modeled by a pattern model of higher abstraction. Also in a preferred embodiment, in step (b), the difference tree structures contain the nodes and hierarchical paths between nodes in each workspace. In some cases, in step (b), the data tree structures for each workspace are rendered symmetrical to each other by generation and placement of a dummy node in the structure of a workplace where no node corresponding to an existing node in a compared workspace exists. In other cases, in step (c), the difference computation is performed incrementally. In still other cases, in step (d), differences include version differences association differences and property differences, and in still others, in step (e) the sub-trees are updated dynamically with results of the merge operation.

In yet another aspect of the invention a modeling structure for modeling views of meta models representing object association graphs used as templates in difference and merge computations between at least 2 object oriented workspaces of an object oriented software system is provided, comprising a pattern node for specifying a meta object, the pattern node mapping to the meta object, a pattern edge node representing an in or out association of the pattern node, the pattern edge node for modeling at least one meta association of the meta object, and a pattern property node of the pattern node, the pattern property node for modeling at least one meta property of the meta object. The modeling structure is characterized in that the pattern model is a meta meta model abstraction and meta models defined as instances of the pattern model specify the object association graphs for use in the difference and merge operations between the workspaces.

In a preferred embodiment the structure occupies a highest abstraction level in a three-tier modeling framework. Also in a preferred embodiment the structure specifies a view specification language for the meta models modeled according to the structure.

In embodiments of the invention described in enabling detail below, for the first time a software tool for computing and displaying differences in object oriented workspaces compared and for reconciling the differences is provided wherein a user monitors the data structures in each workspace from the display window and executes the difference and merge operations through interaction with the data structure.

BRIEF DESCRIPTION OF THE DRAWING FIGURES

DESCRIPTION OF THE PREFERRED EMBODIMENTS

According to an embodiment of the present invention, the inventor provides a software mechanism for model version comparison that provides automated diff & merge capability with dynamic update capability. The method and apparatus of the invention is described in enabling detail below.

Figure 1:
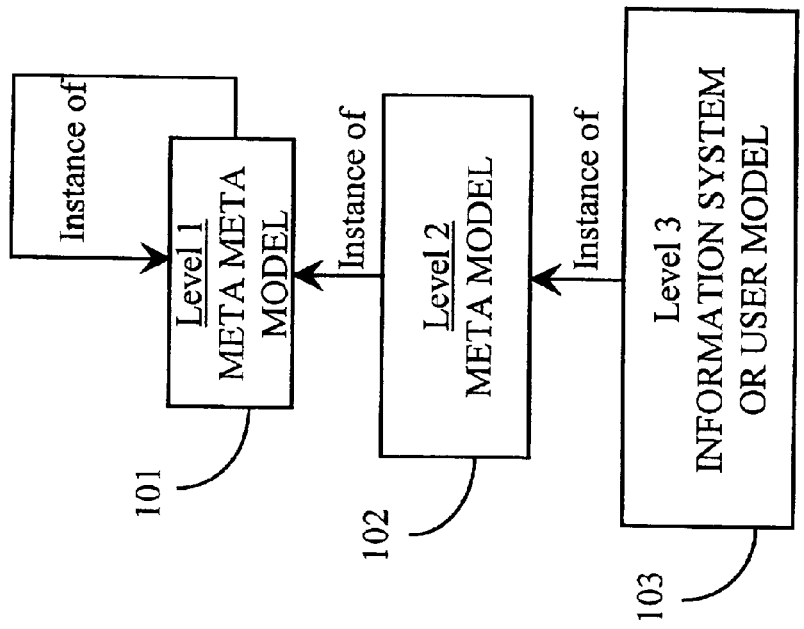
FIG. 1 is a block diagram illustrating an object-modeling framework according to an embodiment of the present invention.

FIG. 1 is a block diagram illustrating a meta-modeling framework according to an embodiment of the present invention. A meta-modeling framework is provided that defines a hierarchical structure for enabling a programmable visual user interface for diagrammatical notation and editing of abstract models. The framework of this example enables end-users to easily specify visual diagrammatic notation for modeling abstractions of a particular view of a system component introduced by them. It is noted herein that the framework of this example is mappable to a subset of Object Management Group's (OMG) meta-modeling standard meta object facility (MOF). This means that any standard meta-modeling framework that conforms to MOF can use techniques modeled in terms of the tri-layer modeling framework of this example.

The modeling framework of this example comprises 3 levels of abstraction. These are a level 1 meta meta model represented herein by a block labeled with the element number 101, a level 2 meta model represented herein by a block labeled with the element number 102, and a level 3 user model or information system model represented herein by a block labeled 103.

Meta meta model 101 is exemplified as a base or root model having the highest level of abstraction. Meta meta model 101 is the basic building block for modeling meta models. Model 101 is capable of modeling itself as illustrated by a directional arrow labeled Instance Of emanating from and then leading back in to meta meta model 101. Meta meta model 101 is, in a preferred embodiment, the root component of instantiation hierarchy of the modeling framework. Instantiation hierarchy refers to hierarchical representation of abstractions with concrete instances. Meta meta model 101 has objects, associations and properties, which will be detailed further below.

Meta model 102 is an instance of meta meta model 101 as illustrated by a directional arrow labeled Instance Of emanating from model 102 and referring back to model 101. Meta model 102 has meta objects with associated meta properties, and meta associations defined between meta objects. Meta model 102 has a lower level of abstraction than model 101 and defines the structure and semantics for implementation of the information system model and can be in one embodiment, a UML meta model.

Model 103, referred to herein as an information system model or a user model is an instance of a meta model 102 as illustrated by a directional arrow labeled Instance Of emanating from model 103 and referring back to model 102. Model 103, at the lowest level of abstraction in the framework, captures specified description of the information system modeled from various points of view as is specified by meta model 102. For example, model 103 may be a UML model of an entire banking system. It is noted herein that the modeling framework of this example is abstract enough to support UML and other standard techniques like ER-modeling. A meta-modeling framework such as the one presented in this example provides a generic modeling language for describing any standard modeling method including UML.

Figure 2:
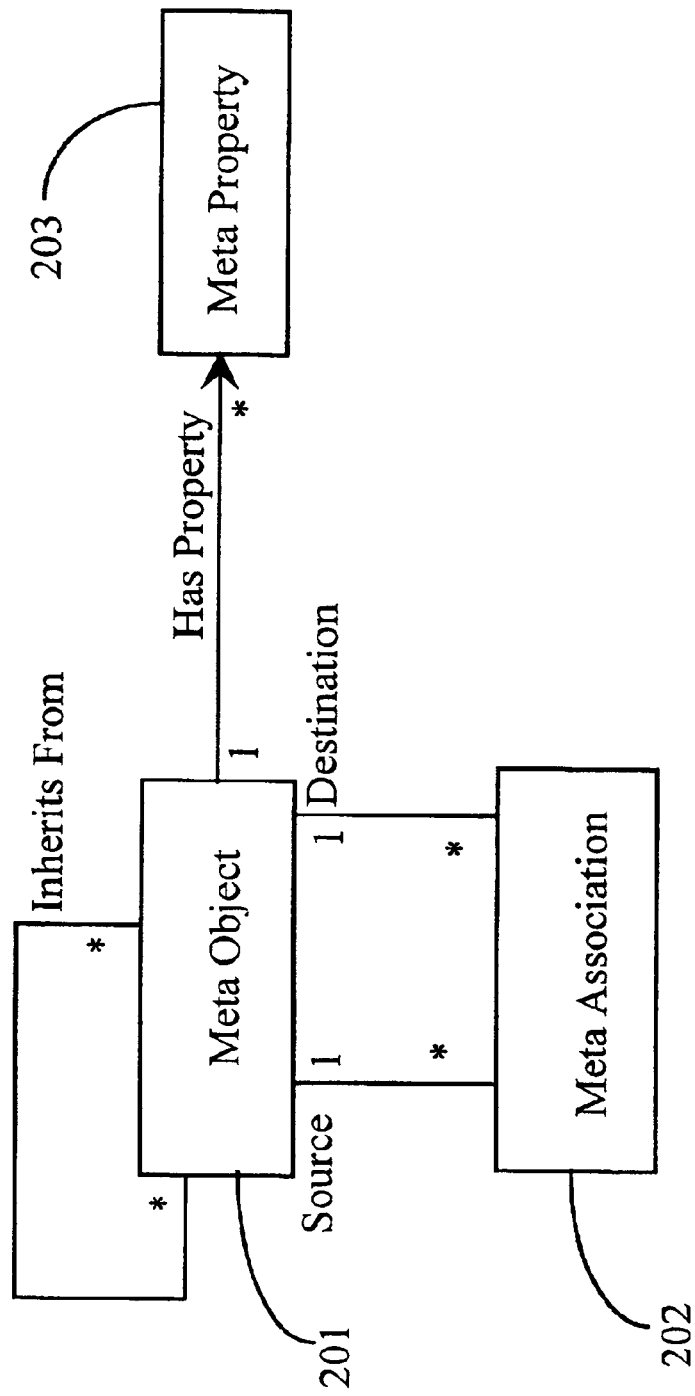
FIG. 2 is a block diagram illustrating a meta meta model according to the structure of the framework of FIG. 1.

FIG. 2 is a block diagram illustrating data structure of meta meta model 101 of FIG. 1 according to an embodiment of the present invention. Meta meta model 101 has a unique structure that supports one to one, one to many, or many to many associations. In the diagram, the notation 1 refers to one and the notation * refers to many. Default cardinality is shown in this example. In basic form meta meta model 101 has a meta object illustrated herein by a block labeled with the element number 201. Meta object 201 has a name, description, and a property (AbstractConcrete) that indicates whether the described object is an abstract object (cannot have instances) or a concrete object, which can have instances. Meta object 201 may inherit attributes from another meta object. This fact is illustrated by a connector loop labeled Inherits From with the default notation *to* meaning many to many.

Meta object 201 has a meta property object, illustrated herein by a block labeled Meta Property and given the element number 203. Meta property 203 is an object that describes a DataType (syntax). DataType includes the attributes Char (character), Number, and Binary. DataType also includes a data Size (syntax), which is equal to size of Char String and Number. A directional arrow labeled Has Property emanating from meta object 201 and progressing to meta property 203 illustrates object ownership of the meta property. Default cardinality for meta object 201 and meta property 203 is 1 to * or one to many.

Meta object 201 carries a meta association object illustrated herein as a block labeled Meta Association and given the element number 202. Meta association 202 has a forward and reverse name and a source and destination, which is optional meaning that the association is optional or mandatory for either a source object or a destination object. Meta association 202 also has a cardinality value for source and destination. The cardinality can be equal to one or more than one (many). In this example it is 1 to many (1, *). A further property of meta association 202 is the identification of the owner of the association, which can be the source object of the association or the destination object of the association.

Meta object 201 may inherit associations and properties from other meta objects as previously described above and illustrated by the connector line labeled Inherits From. This may occur on a one to many or on a many to many object basis as is shown in this example. Meta object 201 may have many meta properties 203 on a one to many basis as is shown.

It will be apparent to one with skill in the art of object modeling that this example is basic in form and is intended only to show the most basic hierarchical structure of the meta meta model. It will be appreciated that actual model structures would appear far more complex.

It will also be apparent to one with skill in the art that the meta model framework taught herein makes it very simple to extend standard modeling methods like UML with domain and/or application specific modeling abstractions. It is also possible to integrate different modeling methods by describing them as instances of a single unified meta-model.

The modeling framework and model structure presented above with respect to FIG. 1 and FIG. 2 provide a blueprint for model extension as well as symmetry with regards to diff & merge presentation data. The desire that diff & merge operations on parallel workspaces be presented in a semantic way that is understandable and user friendly is facilitated by the modeling framework and structure.

Diff & Merge

In diff & merge operations, two versions of an object are compared based primarily on object identification (ObjectIds) and secondarily in terms of their property values and associations. Comparison of two objects by themselves is not of much value unless it is performed in a context of an object's associated objects. Such a context is necessary while merging versions of an object.

In a general sense in any given model, some objects play the role of primary objects and others play the role of companion objects. For example, in an object oriented (OO) model, Class is a primary object and Attribute is a companion object. Two attributes should only be compared in the context of the Classes to which they belong. In an embodiment of the present invention, comparison and merge operations are performed according to specified object-association graphs also known as patterns. This technique obfuscates prior-art techniques of providing hard-coded comparison contexts.

In one embodiment, a simple example graph or pattern could be Class-Has-Attribute; Class-Has-Operation. Using object-association patterns, it is also possible to specify a list of the properties to be compared. In addition to providing a context for comparison and merge, a pattern also acts to limit the scope of comparison to models of interest. For example, UML has modeling elements corresponding to use-case models, object models, state chart models, and so on. If just the object models are to be compared, an object-association pattern is specified that includes only those modeling elements and associations that constitute the object model such as Class, Attribute, Operation, and the like. With an object-model pattern, the scope of comparison is limited to object models excluding all other types of models.

Figure 3:
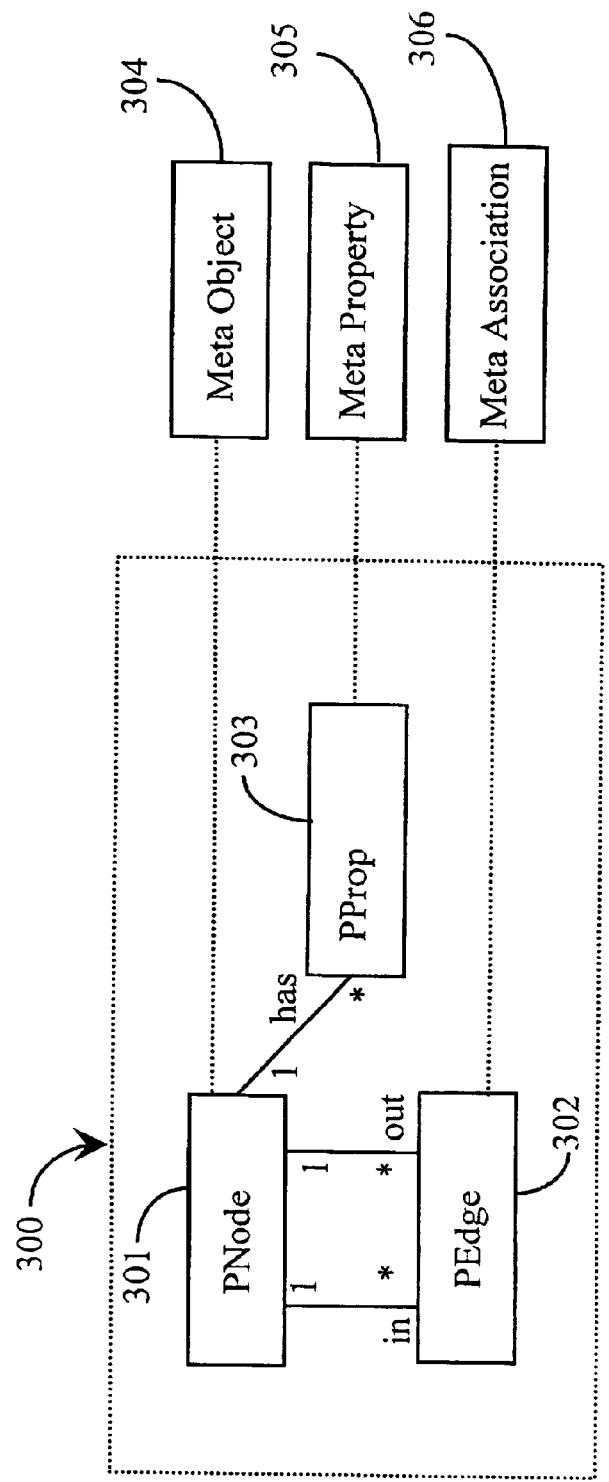
FIG. 3 is a block diagram of a pattern model for pattern-based diff and merge according to the modeling structure of the meta meta model of FIG. 2.

FIG. 3 is a block diagram of a pattern model 300 for pattern-based diff and merge according to the modeling structure of the meta meta model of FIG. 2. Pattern model 300 exhibits the unique modeling architecture described above with reference to the meta meta model of FIG. 2. That is to say that model 300 defines a view over a meta model. Therefore, model 300 is at the same level of abstraction as the meta meta model. The concept of pattern model 300 is in effect a view specification language.

Model 300 has a pattern node (PNode) 301, which maps to a meta object in a meta model, the object illustrated herein as meta object 304. Association is illustrated by a dotted line between node 301 and object 304. Pattern model 300 has a pattern edge (PEdge) 302 associated therewith. Pattern edge 302 maps to a meta association illustrated in this example as meta association 306. The association is illustrated by a dotted line placed between edge 301 and association 306.

Pattern node 301 can specify a set of properties. A property of node 301 is illustrated herein as property (PProp) 303. The association between node 301 and property 303 is represented in this example by a solid line placed therebetween and labeled has meaning "node has property". The cardinality of this relationship is 1 to many (1 *). Property 303 maps to a meta property illustrated in this example as meta property 305. The relationship between property 303 and meta property 305 is illustrated herein with a dotted line placed between the 2 objects.

It is noted herein that pattern node 301 can have many pattern edges 302. Some of these may be "in edges" and some of them may be "out edges" as illustrated by solid connector lines labeled in and out respectively with cardinality denoting 1 to * (many).

Pattern model 300 is the generic model for all patterns for comparison. Pattern node 301 is the model for all pattern nodes and pattern edge 302 is the model for all pattern edges. In every pattern, there is designated a root node. A root node is a pattern node that is the start node for comparison. A pattern can also have cycles. Therefore, there is no restriction that states a root node must have 0 "in edges". A pattern specifies an object-association graph.

A pattern specifies a set of model instance graphs in a workspace. Each instance graph is rooted at a model element that is an instance of the meta-object specified in the root node. This simply means that there are separate graphs describing separate models in the workspace, each model element being an instance (user model) of a meta object described in the pattern node. In practice of the present invention, model comparisons are conducted along each model-instance graph specified by a particular pattern.

Figure 4:
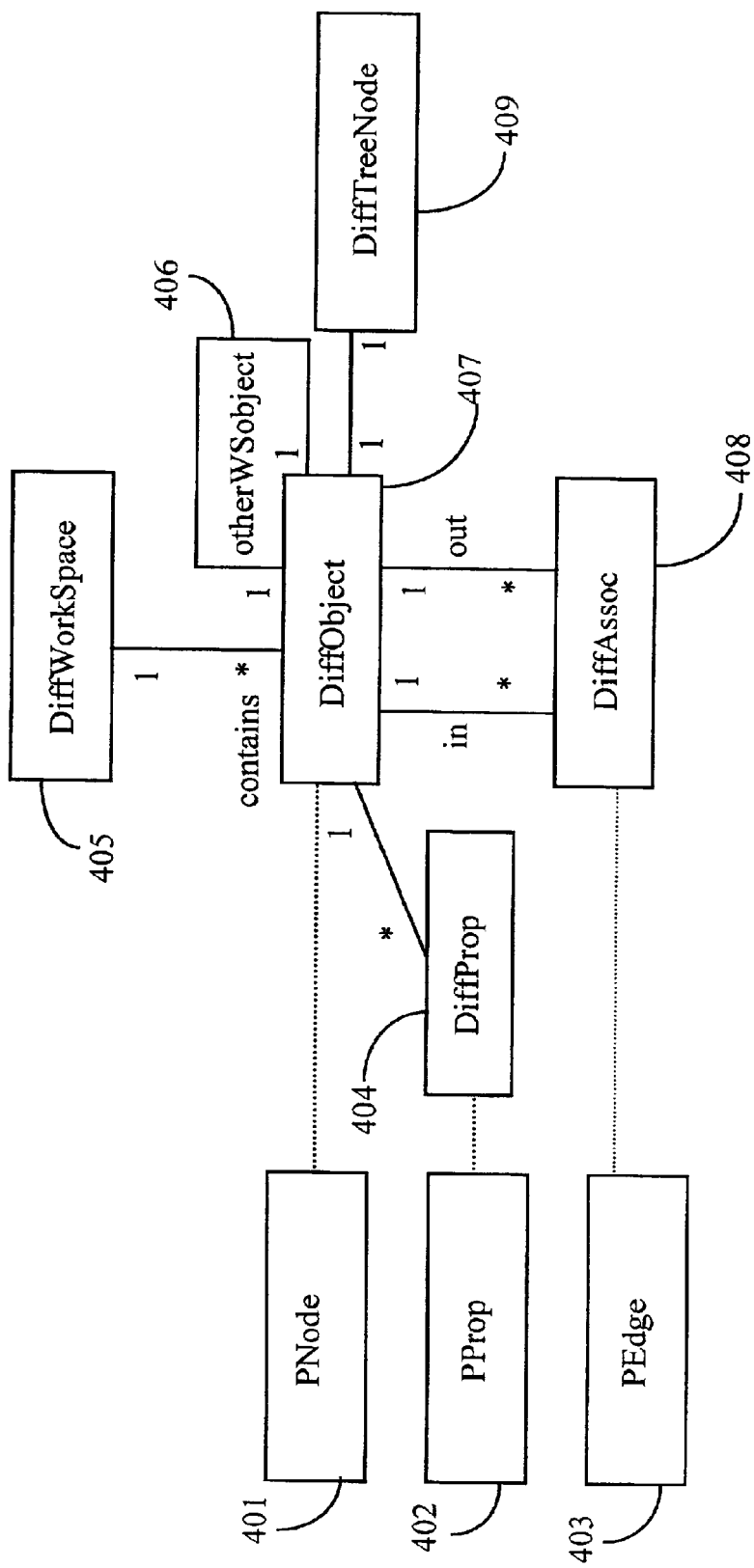
FIG. 4 is a block diagram illustrating a data structure of a difference computation according to an embodiment of the present invention.

FIG. 4 is a block diagram illustrating data structures in model form of a difference computation according to an embodiment of the present invention. An object representing a difference workspace and illustrated herein as (DiffWorkSpace) 405 is represented. DiffWorkSpace 405 is a class and is used for storing model instance graphs that are different in the workspaces being compared. DiffObject 407 is a class used for storing objects that are different in the workspaces being compared. DiffWorkSpace 405 stores pointers to root objects (DiffObjects) of model instance graphs that are different. It is noted that one class DiffWorkSpace represents objects in a source workspace and one class represents objects in a destination workspace. Duality is not represented in this particular model. One workspace 405 can contain many objects 407 as illustrated by the 1 to * notation associated with a connector line placed there between labeled contains.

It is noted in this abstract example that a difference object 407 maps to a pattern node (PNode) 401, which is analogous to the node 301 described with reference to the pattern model 300 of FIG. 3. This mapping specifies that the difference sub-tree rooted at a DiffObject corresponds to the sub-pattern rooted at the pattern node represented by the mapped PNode. Difference object 407 represents an object instance of the meta object 304 of FIG. 3 corresponding to the mapped PNode. It is also noted that a pattern property illustrated herein as (PProp) 402, a property of node 401, maps to a difference property illustrated herein as difference property (Diffprop) 404, which is a property of object 407. Pattern property 402 is analogous to property 303 of FIG. 3. It is further noted herein that a pattern edge illustrated herein as (PEdge) 302, an association of pattern node 401, maps to a difference association illustrated herein as (DiffAssoc) 408, an association of object 407. Pattern edge 403 is analogous to edge 302 of model 300 with reference to FIG. 3 above. Difference object 407 has a pointer to a corresponding workspace object of the same class in the other workspace the relationship represented herein by a connector line with 1 to 1 cardinality and labeled element number 406.

One with skill in the art of modeling will appreciate the symmetrical structure adhered to in this example of a difference data structure. It is noted that all nodes in this data structure are treated as classes in the computation as will be explained further below. A difference tree node (DiffTreeNode) 409 is provided, one for a source workspace and one for a destination workspace. Each object 407 in workspace 405 has a pointer to tree 409 and visa versa. In a preferred embodiment of the present invention difference trees are provided for comparison purposes and are GUI elements that appear in dual windows displaying compared workspaces. Difference trees facilitate dynamic updating during difference and merge computation.

In procedure, if a pattern node is part of a cycle and if the meta object instance corresponding to the pattern node already exists in the instance graph path leading to the pattern node then further traversal of the pattern graph is halted.

If a meta object instance corresponding to the pattern node does not exist in the destination workspace, then the entire instance graph rooted at the corresponding DiffObject node is marked different. In addition, the path from the root DiffObject node to the instant node is marked different.

If the object corresponding to the meta object of the pattern node exists in the destination workspace, and the node has properties to be compared and if the two objects are different in comparison of any of their properties, then the node is marked as different and the path from the root to the instant node is marked as different. If the instant node has outgoing edges then for each associated object corresponding to the meta association of the edge, the difference computation is repeated with the sub-pattern rooted at the destination node of the edge.

A difference computation according to an embodiment of the present invention is disclosed in pseudo code as follows: Note that Darray in the following classes identified in the code refers to a template of the name dynamic array class.

```
Class DiffWorkSpace
{
    Darray<DiffObject> diffObjectArr;
    int DoDiffFromSource(DiffWorkSpace *destWorkSpace, Pnode *rootPatternNode);
    int DoDiffFromDest(DiffWorkSpace *destWorkSpace, Pnode *rootPatternNode);
public:
    int DoDiff(DiffWorkSpace *destWorkSpace, Pnode *rootPatternNode);
};
Class DiffObject
{
    BOOL isDummy;
    long ObjectId;
    int version;
    Pnode *patternNodePtr;
    Darray<DiffProp> propArr;
    Darray<DiffAssoc> outAssocArr;
    DiffAssoc *inAssoc;
    DiffObject *otherWSobject;
    DiffTreeNode *treeNodePtr;
public:
    int DoObjectDiff(DiffObject *destObject, Pnode *patternNode,
                    Darray<DiffObject> *prevObjectArr);
    int DoAssocSrcDiff(DiffObject *destObject, Pedge *patternEdge,
                    Darray<DiffObject> *prevObjectArr);
    int DoAssocDestDiff(DiffObject *destObject, Pedge *patternEdge,
                    Darray<DiffObject> *prevObjectArr);
}
Class DiffAssoc
{
    Pedge *patternEdgePtr;
    DiffObject *inObject;
    Darray<DiffObject> outObjectArr;
}
Class DiffProp
{
    Pprop *patternPropPtr;
    char *value;
}
Class DiffTreeNode
{
    DiffObject *diffObjectPtr;
    Darray<DiffTreeNode> childrenOfTheNode;
}
```

In the pseudo code above, DiffWorkSpace is used for storing 'difference' objects contained in a workspace as described further above with reference to the description of FIG. 4. There are two such instances, one for source workspace and one for destination workspace.

DiffObject stores an object that is different. It stores a pointer to pattern node, a pointer to incoming DiffAssoc object (for non-root objects), an array of pointers to outgoing DiffAssoc objects (for non-leaf objects), and a pointer to its counter part object in the other workspace. It also has a pointer to a tree node corresponding to the difference display window (explained in more detail later in this specification).

Class DiffTreeNode represents a tree node in the difference display window. DiffTreeNode has a pointer to the corresponding DiffObject. In the case that objects exist in one work space but not in the other, dummy nodes are created for DiffTree purposes to maintain symmetry between workspaces. IsDummy under Class DiffObject is a flag to indicate a dummy node. long ObjectId under the same section described above is an object identification (ObjectId) and version number that uniquely identifies the object and version.

DiffObject other WSobject under the class DiffObject is a pointer to the corresponding object in the other workspace. Under class DiffProp, char*value is property value.

Algorithm for Difference Computation

According to a preferred embodiment of the present invention, the difference computation performed in the process described above is facilitated by the following algorithm expressed in pseudo code. The algorithm is for DiffWorkSpace::DoDiff( ), which is the starting method.

```
DiffWorkSpace::DoDiff(DiffWorkSpace *destWorkSpace, Pnode
*rootPatternNode)
{
    DoDiffFromSource(destWorkSpace, rootPatternNode);
    destWorkSpace->DoDiffFromDest(this, rootPatternNode);
}
DiffWorkSpace::DoDiffFromSource(DiffWorkSpace *destWorkSpace,
Pnode *rootPatternNode)
{
    Darray<DiffObject> prevObjectArr;
    Get meta object id from the rootPatternNode.
    Get the list of object instances of the meta object from the
workspace.
    For each object instance
    {
        Instantiate a DiffObject for source
        DiffObject *srcObject = new DiffObject;
        populate srcObject with ObjectID and version info.
        instantiate a DiffObject for destination
        DiffObject *destObject = new DiffObject;
        populate destObject with ObjectID.
        Link source and destination objects
        srcObject->otherWSobject = destObject;
        destObject->otherWSobject = srcObject;
        check if the object instance exists in the destination
workspace.
        if it does not exist in the destination workspace
        {
            destObject->isDummy = TRUE;
            insert srcObject into this workspace's diffObjectArr.
            insert destWorkSpace's diffObjectArr.
        }
        else
        {
            int diffStatus;
            diffStatus = srcObject->DoObjectDiff(destObject,
rootPatternNode, prevObjArr);
            if (diffStatus == DIFFERENT)
            {
                insert srcObject into this workspace's
diffObjectArr.
                insert destWorkSpace's diffObjectArr.
            }
        }
    }
}
DiffWorkSpace::DoDiffFromDest(DiffWorkSpace *destWorkSpace,
Pnode *rootPatternNode)
{ }
int DiffObject::DoObjectDiff(DiffObject *destObject, Pnode
            *patternNode, Darray<DiffObject> *prevObjectArr)
```

-continued

```
{
    int diffStatus = SAME;
    if this object and destObject are different in properties
    {
        diffStatus = DIFFERENT;
    }
    For each outgoing Pedge 'outPedge' of patternNode
    {
        int assocDiffStatus;
        assocDiffStatus = DoAssocSrcDiff(destObject, outPedge,
prevObjectArr);
        if (assocDiffStatus == DIFFERENT)
        {
            diffStatus = DIFFERENT;
        }
        if (!destObject->isDummy)
        {
            assocDiffStatus = destObject-
>DoAssocDestDiff(this, outPedge, prevObjectArr);
            if (assocDiffStatus == DIFFERENT)
            {
                diffStatus = DIFFERENT;
            }
        }
    }
    return diffStatus;
}
int DiffObject::DoAssocSrcDiff(DiffObject *destObject, Pedge
*patternEdge,
            Darray<DiffObject> *prevObjectArr)
{
    int diffStatus = SAME;
    Get meta association represented by patternEdge.
    For each object associated with this object in source workspace
    {
        if patternEdge is part of a cycle
        {
            if associated object already exists in prevObjectArr
            {
                continue;
            }
            insert associated object into prevObjectArr;
        }
        instantiate a DiffObject for source
        DiffObject *srcAssocObject = new DiffObject;
        populate srcAssocObject with ObjectID and version info.
        instantiate a DiffObject for destination
        DiffObject *destAssocObject = new DiffObject;
        populate destAssocObject with ObjectID.
        Link source and destination objects
        srcAssocObject->otherWSobject = destAssocObject;
        destAssocObject->otherWSobject = srcAsocObject;
        Check if destObject has a corresponding associated object in
destination workspace
        if corresponding associated object does not exist in
destination workspace
        {
            destAssocObject->isDummy = TRUE;
            instantiate DiffAsso objects and insert them
            DiffAsso *srcDiffAsso = new DiffAsso( );
            DiffAsso *destDiffAsso = new DiffAsso( );
            insert srcDiffAsso into srcObject's outAssocArr
            srcDiffAsso->inObject = srcObject
            insert srcAssocObject into srcDiffAsso's
outObjectArr
            insert destDiffAsso into destObject's outAssocArr
            destDiffAsso->inObject = destObject
            insert destAssocObject into destDiffAsso's
outObjectArr
            diffStatus = DIFFERENT;
        }
        else
        {
            int assocDiffStatus;
            assocDiffStatus = srcAssocObject-
>DoObjectDiff(destAssocObject,
                    patternEdge->outPNode,
                prevObjectArr);
            if (assocDiffStatus == DIFFERENT)
```

-continued

```
        {
              Instantiate DiffAsso objects and insert them
              DiffAsso *srcDiffAsso = new DiffAsso( );
              DiffAsso *destDiffAsso = new DiffAsso( );
              insert srcDiffAsso into srcObject's
outAssocArr
              srcDiffAsso->inObject = srcObject
              insert srcAssocObject into srcDiffAsso's
outObjectArr
              insert destDiffAsso into destObject's
outAssocArr
              destDiffAsso->inObject = destObject
              insert destAssocObject into destDiffAsso's
outObjectArr
              diffStatus = DIFFERENT;
         }
      }
   }
   return diffStatus;
}
int DiffObject::DoAssocDestDiff(DiffObject *destObject, Pedge
*patternEdge,
              Darray<DiffObject> *prevObjectArr)
{
}
```

The function DoDiffFromDest is very similar to the function DoDiffFromSource except for a fact that DoDiffFromDest does not have to handle a case of an object existing in both workspaces because this case is handled in DoDiffFromSource. Likewise, the function DoAssocDestDiff is very similar to the function DoAssocSrcDiff except for a fact that DoAssocDestDiff does not have to handle a case of an object existing in both workspaces because this case is handled by the function DoAssocSrcDiff.

The function DoAssocDestDiff is very similar to the function DoAssocSrcDiff except for a fact that DoAssocDestDiff does not have to handle a case of an associated object existing in both workspaces because this case is handled by the function DoAssocSrcDiff.

One with skill in the art will recognize that the difference computation algorithm presented immediately above computes and populates difference data structures in a symmetric manner. For example, for each DiffObject in the source workspace there has to be a corresponding DiffObject in the destination workspace. In order to maintain the symmetry of computation and population, a dummy object is generated for the workspace not containing a real object when a real object does not exist in corresponding fashion in both workspaces.

In a preferred embodiment of the invention, difference data is presented in a user display window that has a left half and a right half, each containing a tree control corresponding to the source and destination workspaces respectively. A root node in the difference tree represents the workspace. The first level tree nodes are created from diffObjectArr of DiffWorkSpace. In a preferred embodiment there are tree node pointer (treeNodePtr) members of corresponding difference objects (DiffObjects). Pointers are stored therein pointing to corresponding tree nodes. Each tree node also stores a pointer to its corresponding DiffObject. These pointers are stored in a difference object pointer (diffObjectPtr) member provided to the node. A double click cursor action on a tree node by a user operating in the window interface creates child nodes by traversing an out association array (outAssocArr) of a corresponding DiffObject.

In addition to data structures mentioned further above in this specification, there also exists a data structure adapted to maintain lists of DiffObject elements that correspond to each unique ObjectId occurring in a DiffWorkSpace. This structure is expressed in the following pseudo code:

```
Class DiffObjectList
{
      long ObjectId;
      Darray<DiffObject> diffObjectArr;
}
```

The data class defined by the structure above is adapted to store all occurrences of DiffObject elements corresponding to a given ObjectId in a DiffWorkSpace. DiffObjectList objects are, in a preferred embodiment, stored in a hash table to facilitate faster access. One hash table is provided for each workspace.

Merge Impact Propagation

A merge operation involves selecting a DiffTreeNode at a required level of tree expansion and performing a copy operation from the source workspace to the destination workspace or in reverse order. In a merge operation, object properties and associations are copied from one workspace to the other. If the copy is performed at an aggregate node, then the copy operation is performed recursively down the sub tree of that node.

The copy operation described above aggregates all modified DiffObject elements (properties,associations) into an array called mergedObjects. Following is an algorithm expressed in pseudo code for propagating the impact:

```
PropagateImpact( )
{
      For each DiffObject element in the array mergedObjects
      {
           Get the corresponding DiffObjectList element that has the
same ObjectId from the hash table.
           For each srcDiffObject element (except the DiffObject of the
outer loop)
                 in the diffObjectArr of the DiffObjectList
           {
                 destDiffObject = srcDiffObject->otherWSobject;
                 delete the tree nodes corresponding to srcDiffObject
and destDiffObject if they exist.
                 compute difference again.
                 Darray<DiffObjectArr> prevObjectArr;
                 srcDiffObject->DoObjectDiff(destDiffObject,
srcDiffObject->treeNodePtr, prevObjectArr);
                 If the deleted tree node was a first level tree node,
then recreate the node.
           }
      }
}
```

The method and apparatus of the present invention provides several advantages. First and foremost, pattern-based diff&merge capability provides intelligent structure-driven comparison and merge operations that are unavailable in prior art software tooling. Additionally, the merging capability of the present invention maintains difference presentations in a dynamically updated state as differences are reconciled. The software accomplishes this by incrementally re-computing differences of all impacted model elements. The method and apparatus of the invention increases productivity of repository implementation teams through quick implementation of a customized diff&merge tool for pre-defined meta models. Pre-packaged patterns may also be extended with model elements introduced by team members providing instant customization capabilities.

The method and apparatus of the present invention may be applied to commercial model repository systems that support a variety of modeling languages. Therefore the method and apparatus of the present invention should be afforded the broadest possible scope under examination. The spirit and scope of the present invention is limited only by the claims that follow.

What is claimed is:

1. A software tool for computing and displaying differences in at least two object oriented workspaces compared and for reconciling the differences by merging the workspaces comprising:

at least one object association graph used as a modeled template for defining the nodes and node paths involved in the difference computation;

a data tree structure for displaying element hierarchy symmetrically in each of the compared workspaces;

an executable function for merging the separate workspaces to reconcile the found differences; and an interactive user display window for visualizing and directing the process;

characterized in that a user monitors the data structures in each workspace from the display window and executes the difference and merge operations through interaction with the data structure.

2. The software tool of claim 1 wherein one of the workspaces is a source workspace and one or more workspaces are destination workspaces.

3. The software tool of claim 1 wherein differences include model version, model associations and model properties of same class of models.

4. The software tool of claim 1 wherein the data tree structures for each workspace are rendered symmetrical to each other by generation and placement of a dummy node in the structure of a workplace where no node corresponding to an existing node in another workspace exists.

5. The software tool of claim 1 wherein the difference computation is performed separately for each object association graph included in a workspace.

6. The software tool of claim 1 wherein the merge operation is performed incrementally.

7. The software tool of claim 1 wherein each workspace is dynamically updated during the merge operation.

8. The software tool of claim 1 wherein the interactive display window is divided according to number of workspaces.

9. A method for computing differences and reconciling the differences associated with at least two separate workspaces of an object oriented software system comprising steps of:

(a) developing at least one model association graph specifying the nodes, attributes and properties used as a template for comparison of the workspace objects;

(b) establishing a difference tree structure of nodes and attributes for presentation of each workspace to be compared;

(c) executing a difference computation at a root node within the source workspace, the computation progressing down the sub-tree of the root node in compared workspaces;

(d) displaying differences if any in the tree structures of the workspaces; and (e) executing at least one merge operation if differences are found by interacting with the displayed tree structure at the node containing the differences, the merge operation progressing down the sub-trees of the activated node represented in the compared workspaces.

10. The method of claim 9 wherein in step (a) the model association graph is a view of a meta model modeled by a pattern model of higher abstraction.

11. The method of claim 9 wherein in step (b) the difference tree structures contain the nodes and hierarchical paths between nodes in each workspace.

12. The method of claim 9 wherein in step (b) the data tree structures for each workspace are rendered symmetrical to each other by generation and placement of a dummy node in the structure of a workplace where no node corresponding to an existing node in a compared workspace exists.

13. The method of claim 9 wherein in step (c) the difference computation is performed incrementally.

14. The method of claim 9 wherein in step (d) differences include version differences association differences and property differences.

15. The method of claim 9 wherein in step (e) the sub-trees are updated dynamically with results of the merge operation.

16. A modeling structure for modeling meta models representing object association graphs used as templates in difference and merge computations between at least 2 object oriented workspaces of an object oriented software system comprising:

a pattern node for specifying a meta object, the pattern node mapping to the meta object;

a pattern edge node representing an in or out association of the pattern node, the pattern edge node for modeling at least one meta association of the meta object; and a pattern property node of the pattern node, the pattern property node for modeling at least one meta property of the meta object;

characterized in that the pattern model is a meta meta model abstraction and meta models defined as instances of the pattern model specify the object association graphs for use in the difference and merge operations between the workspaces.

17. The modeling structure of claim 16 wherein the structure occupies a highest abstraction level in a three-tier modeling framework.

18. The modeling structure of claim 16 wherein the structure specifies a view specification language for the meta models modeled according to the structure.

* * * * *

UNITED STATES PATENT AND TRADEMARK OFFICE
CERTIFICATE OF CORRECTION

PATENT NO. : 6,904,588 B2
DATED : June 7, 2005
INVENTOR(S) : Sreedhar Sannareddy Reddy and Josyula Ramakrishna It is certified that error appears in the above-identified patent and that said Letters Patent is hereby corrected as shown below:

Title page,
Item [73], Assignee, now reads: "TAT Consultancy Services Limited, Nariman Point Mumbai (IN)" should read: -- TATA Consultancy Services Limited, Narimam Point Mumbai (IN) --

Signed and Sealed this

Nineteenth Day of July, 2005

JON W. DUDAS
*Director of the United States Patent and Trademark Office*